United States Patent [19]

Kato

[11] Patent Number: 4,673,329

[45] Date of Patent: Jun. 16, 1987

[54] ARM DEVICE FOR INDUSTRIAL ROBOT

[75] Inventor: Hisao Kato, Aichi, Japan

[73] Assignee: Mitsubishi Denki Kabushiki Kaisha, Tokyo, Japan

[21] Appl. No.: 720,222

[22] Filed: Apr. 5, 1985

[30] Foreign Application Priority Data

Apr. 6, 1984 [JP] Japan .................................. 59-67405
Oct. 11, 1984 [JP] Japan ................................ 59-213133

[51] Int. Cl.$^4$ ............................................ B25J 19/06
[52] U.S. Cl. .................. 414/744 A; 901/49; 901/28
[58] Field of Search ............... 414/744 A; 901/49, 28, 901/29, 41; 403/141, 142, 143, 144, 90, 114

[56] References Cited

U.S. PATENT DOCUMENTS

| 763,380 | 6/1904 | Eble et al. | 403/142 X |
| 1,780,383 | 11/1930 | Green | 403/114 X |
| 3,691,788 | 9/1972 | Mazziotti | 403/90 X |
| 4,159,186 | 6/1979 | Funcke | 403/114 X |
| 4,194,437 | 3/1980 | Rosheim | 901/28 X |
| 4,514,616 | 4/1985 | Warner | 901/49 X |

Primary Examiner—Joseph E. Valenza
Assistant Examiner—D. Glenn Dayoan
Attorney, Agent, or Firm—Sughrue, Mion, Zinn, Macpeak & Seas

[57] ABSTRACT

An arm device for an industrial robot including an evading mechanism for evading extraordinary external force. The evading mechanism is composed of a housing coupled and secured to an arm and having, in one preferred embodiment, a plurality of projecting parts defining therebetween openings. A movable member is housed in the housing and held by the projecting parts so as to be rotatable in both horizontal and vertical directions. Coupling members are provided for applying a predetermined coupling force between the housing and the movable member so as to inhibit relative movement between the movable member and the housing for normal operations but allowing relative movement between the housing and the movable member upon occurrence of an extraordinary external force. The evading mechanism is coupled with an operating mechanism by a coupling shaft of a diameter less than the width of the openings between the projecting parts.

9 Claims, 11 Drawing Figures

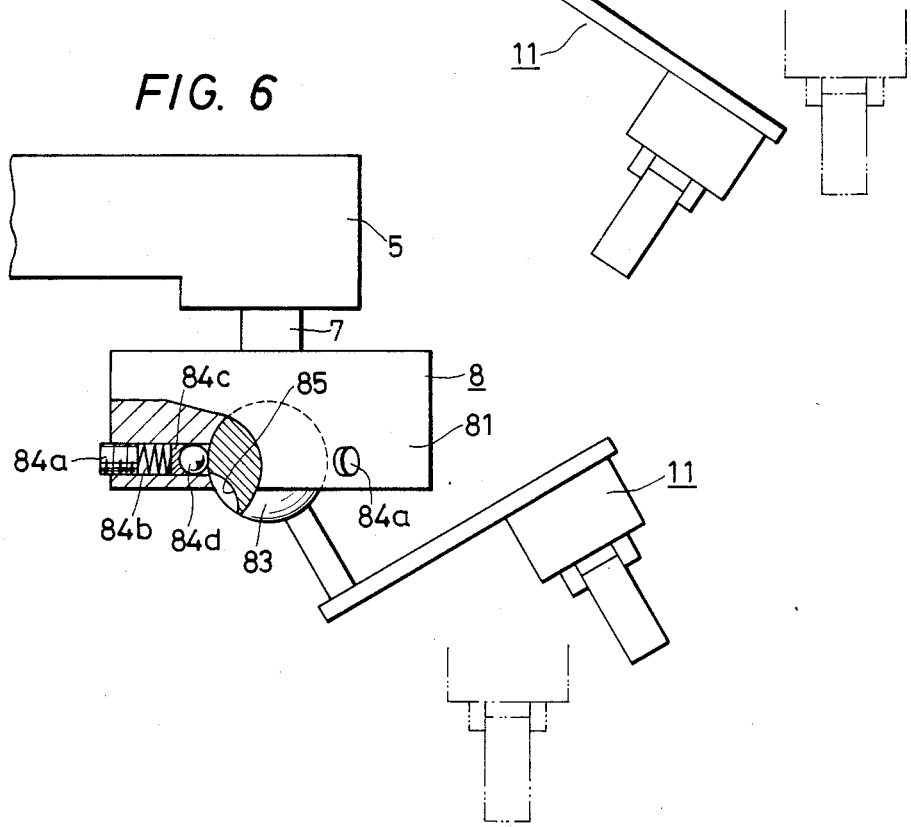

ARM DEVICE FOR INDUSTRIAL ROBOT

BACKGROUND OF THE INVENTION

The present invention relates to an arm device for an industrial robot used for welding or assembly operations. More particularly, the invention relates to an arm device for an industrial robot which is prevented from being damaged by impact if it strikes an obstacle.

Heretofore, there have been provided industrial robot devices, as disclosed in, for example, Japanese Laid-Open Patent Publication No. 160094/83, whose robot arms are allowed to freely rotate in at least one of horizontal and vertical directions when an excessive torque is exerted thereon so as to prevent extraordinary external forces from being applied to the operating mechanism of the arm.

However, such conventional devices have a large and complicated structure, and therefore, disadvantageously, a high manufacturing cost since mechanisms for allowing movement in both in horizontal and vertical directions have to be arranged in different positions.

SUMMARY OF THE INVENTION

An object of the present invention is to eliminate the above-mentioned problems and to provide an arm device for a robot having an impact evading mechanism employing a simple and miniaturized structure.

A further object of the present invention is to make the evading range of the impact evading mechanism larger upon evasion of impact so as to more effectively evade impacts and protect the arm device from damage.

An arm device for an industrial robot according to the present invention is characterized in that an evading machine comprises a housing fixedly coupled to an arm, a movable member rotatably held in horizontal and vertical directions in this housing, and a coupling mechanism which applies a predetermined couplng force between the housing and the movable member so as to inhibit relative rotational movement between the housing and the movable member during normal operations but, upon the occurrence of an extraordinary external force, to permit relative rotational motion between the housing and the movable member.

In accordance with preferred embodiment of the present invention, the member which houses and holds the movable member is composed of projecting parts. In this case, openings defined between these projecting parts are usable for evading motion, as a result of which the range of evading motion is greatly enlarged, that is, the evading motion can extend over more than 90 degrees from the normal position of the arm device.

Further, the evading mechanism according to a preferred embodiment of the present invention is composed of a housing having projecting parts and a movable member rotatably mounted in the housing in such a manner that the movable member, which is a relatively movable single member, permits evading motion in all directions. Accordingly, the evading mechanism can be simple in structure.

Other objects, features and advantages of the invention will be readily apparent from the following description of certain preferred embodiments thereof, taken in conjunction with the accompanying drawings, although variations and modifications may be effected without departing from the spirit and scope of the novel concepts of the invention.

BRIEF DESCRIPTION OF THE DRAWINGS

FIGS. 5 and 6 are explanatory views for describing the operation of an evading mechanism and an arm device of the invention;

DESCRIPTION OF THE PREFERRED EMBODIMENTS

FIGS. 1 through 6 all show a preferred embodiment of the present invention.

Figure 1:
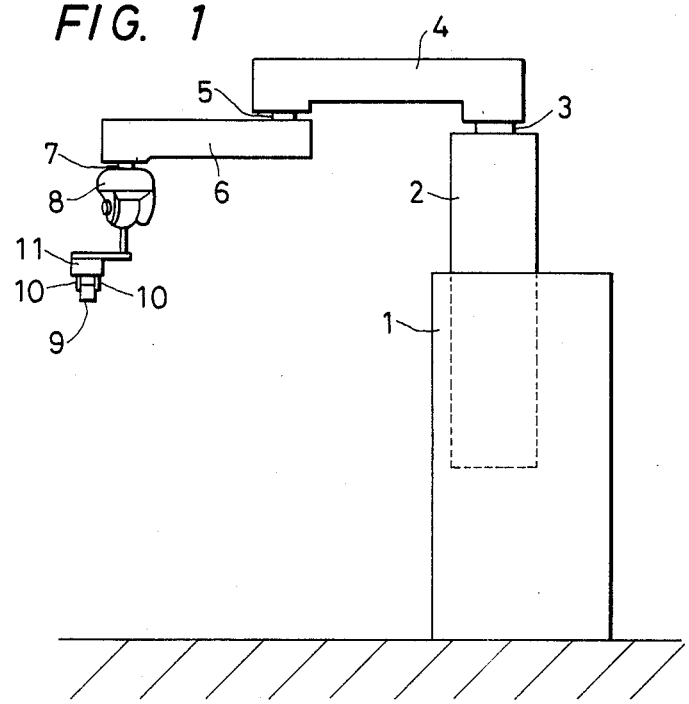
FIG. 1 is a front view illustrating the overall arrangement of an industrial robot in which the structure of the present invention can be applied.

Referring at first to FIG. 1, a rotary drive shaft 3 is rotatably fitted to a column 2 fixed to the top of a base member 1. A first arm 4, coupled to the top end of the drive shaft 3, is rotated in a horizontal plane in association with the rotary motion of the drive shaft 3, by a motor (not shown).

To the front end of the first arm 4 is attached a rotary drive shaft 5, to the lower end of which a second arm 6 is coupled in such a manner that the latter can rotate in a horizontal plane in association with the rotary motion of the drive shaft 5, similarly to the first arm 4.

The second arm 6 carries at its front end a rotary drive shaft 7, to the lower end of which an impact evading mechanism (described hereinbelow) is coupled in such a manner that the entire evading mechanism 8 can be rotated in association with the rotating motion of the device shaft 7.

An operating mechansim 11, having a pair of pawls 10 for gripping an article 9 and coupled to the lower part of the impact evading mechanism 8, normally rotates in a horizontal plane in association with the rotary motion of the drive shaft 7 through the intermediary of the evading mechanism 8.

Figure 2:
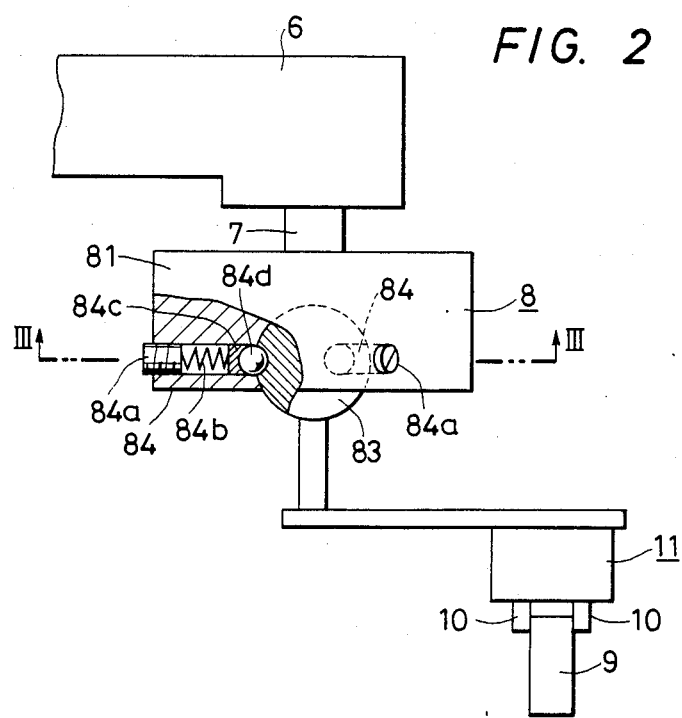
FIG. 2 is a lateral view showing in cross-section an arm device of the present invention.
Figure 3:
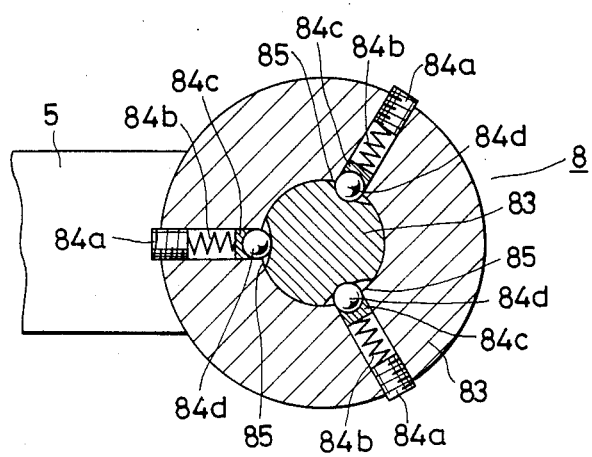
FIG. 3 is a cross-sectional view taken along a line III—III in FIG. 2.
Figure 4:
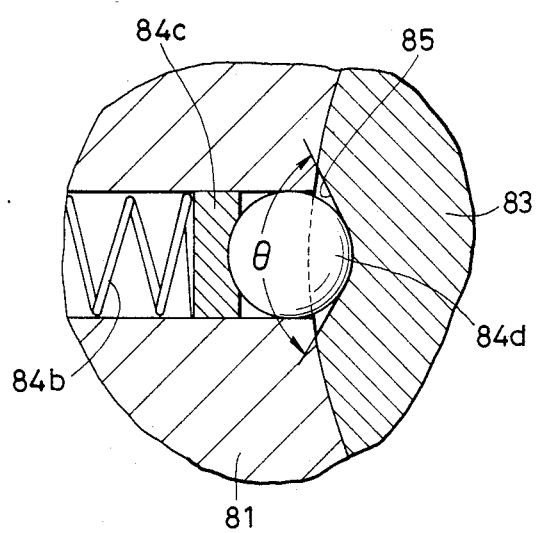
FIG. 4 is an enlarged view showing a spherical member and balls which are in pressing contact with conical recesses formed in the spherical member.

FIGS. 2, 3 and 4 show the details of the abovementioned impact evading mechanism 8. A housing 81 is coupled to the drive shaft 7 so that the housing 81 rotates in association with the rotation of the drive shaft 7. The housing 81 defines therein a spherical socket open at its lower end. A spherical member 83 is housed in this spherical socket, and is rotatably held therein. The spherical member 83 is formed with generally conical recesses 85 which are opposed to coupling mechanisms 84 that are mounted in the housing 81 lying in a single plane and are spaced from each other at 120 degree intervals.

The coupling mechanisms 84 each include adjusting screws 84a, a coil spring 84b, a washer 84c and a ball 84d, all of which are disposed in a hole extending horizontally from the outer surface to the inner socket of the housing 81. These coupling mechanisms 84 apply a coupling force such that the rotational motion of the housing 81 is ordinarily transmitted to the spherical member 84. The magnitude coupling of this coupling force can be adjusted with the adjusting screws 84a.

The operating mechanism 11, which is fixedly coupled to the spherical member 83 via an operating shaft 11a, rotates in a horizontal plane in association with the rotation of the spherical member 84. Further, a mechanism (not shown), which is disposed in a housing of the operating mechanism 11, opens and closes the pawls 10 to grip and release an article 9.

Next, the operation of the above-described arrangement will be explained.

If the operating mechanism 11 strikes an obstacle in the way of its horizontal movement effected by rotation of the drive shaft 7 and/or in association with the rotation of the second arm 6, the operating mechanism 11 stops moving at that position. Since the drive shaft 7 and/or the second arm 6 continue to move, the spherical member 83 is rotated in the socket, whereupon the balls 84d of the coupling mechansim 84 come out of the recesses 85 in the spherical member 83, overcoming the forces of the coil springs 84b. Thus, the operating mechanism 11 can easily move relative to the housing 81, and therefore, as shown in FIGS. 5 and 6, the operating mechanism 11 performs a generally vertical evading motion, preventing the transmission of high impact forces and resulting damage.

Not only can the above-mentioned vertical evading motion be perforemd, but also the evading motion can also be carried out in horizontal and oblique directions; that is, the evading motion can be made in all directions.

Further, a shown in FIG. 4, the angle θ of the conical recesses 85 and the resilient force of the springs 84b are set such that, when the operating mechanism 11 is performing its normal operation (i.e., no obstruction is present), the housing 81 of the evading mechanism 8 and the spherical member 83 are coupled integrally together to allow the operating mechanism 11 to carry out its assigned operations. However, if the operating mechanism 11 strikes an obstacle due to erroneous operation and the balls 84d come out of the conical recesses 85 in the spherical member 83 due to impact with the obstacle, as shown in FIGS. 5 and 6, the operating mechanism 11 can evade the obstacle, preventing the operating mechanism 11 from being damaged.

Accordingly, as mentioned above, the present invention offers the advantage that the housing 81 of the evading mechanism 8 is always coupled integrally with the spherial member 83 when the operating mechanism 11 is carrying out its normal assigned operation, but when the operating mechanism 11 strikes an obstacle, such as may occur due to erroneous operation, the balls 84d are permitted to come out of the conical recesses 85 in the spherical member 83 due to the impact upon striking the obstacle, allowing the operating mechanism 11 to evade the obstacle and preventing damage due to the impact.

Figure 7:
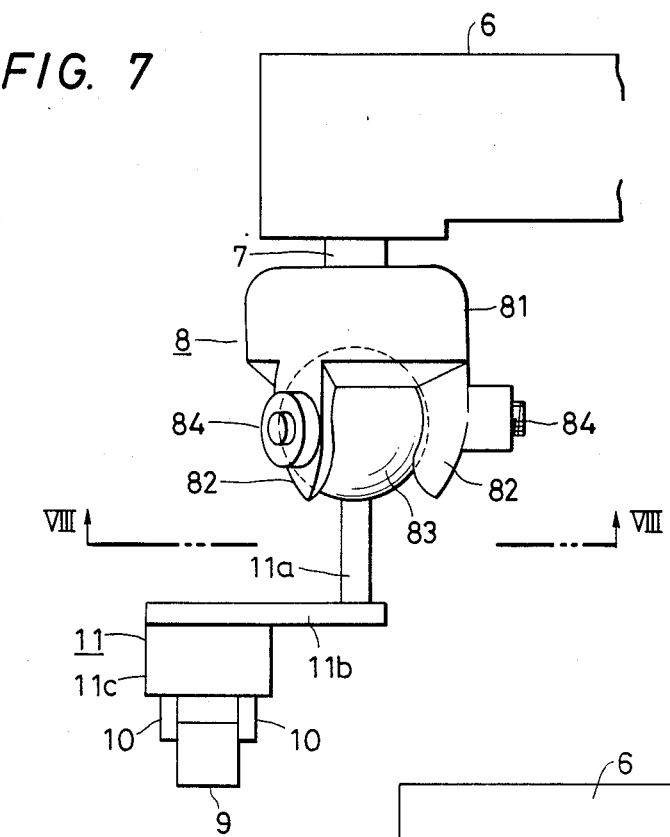
FIG. 7 is a front view illustrating an evading mechanism and an operating mechanism which are provided to the front end of the arm device shown in FIG. 1.
Figure 8:
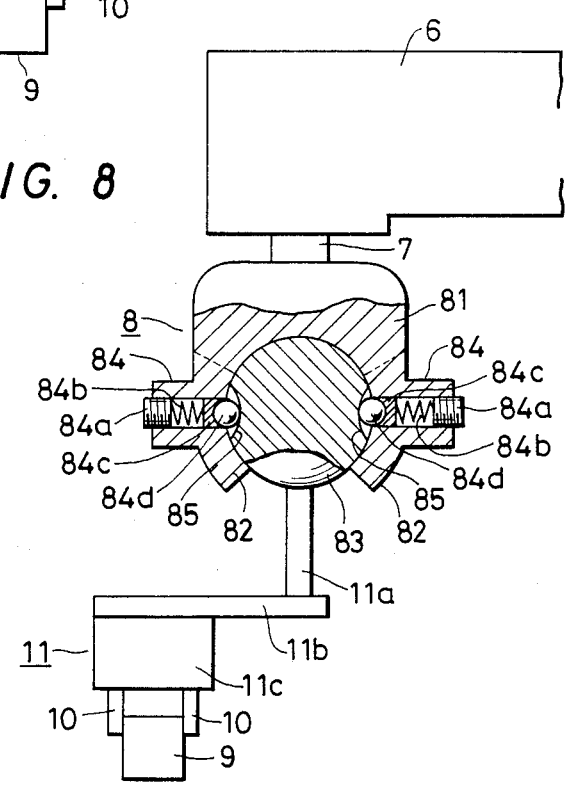
FIG. 8 is a partially broken front view illustrating the internal arrangement of the evading mechanism shown in FIG. 7.

FIGS. 7 and 8 show the details of another embodiment of an impact evading mechanism of the invention.

In this embodiment, the housing 81 is coupled to the drive shaft 7 so that the housing 81 is rotated as the drive shaft 7 rotates. The housing 81 is formed in its lower section with three projecting parts 82, which are curved inwardly and equiangularly spaced apart. A spherical space is formed inside the housing 81, defined by the inner surface of the housing 81 and the inner surfaces of the projecting parts 82. A spherical member 83, as shown in FIG. 8, is housed and rotatably held in the spherical space. The spherical member 83 is formed therein with recesses 85, which are opposed to coupling mechanisms 84 disposed in respective ones of the projecting parts 82.

The coupling mechanisms 84 are each composed of an adjusting screw 84a, coil springs 84b, washers 84c, and balls 84d, which are disposed in a hole that extends horizontally through the respective projecting parts 82. These coupling mechanisms 84 exert a coupling force with which the rotational motion of the housing 81 can be transmitted to the spherical member 83. This coupling force can be adjusted with the adjusting screws 84a.

Openings are defined between each of the adjacent projecting parts 82. The upper ends of these openings (the lower edge surface of the housing 81) are located above the rotational center of the above-mentioned spherical member 83.

The operating mechanism 11 is coupled and fixed to the spherical member 83 via an operating shaft 11a. Accordingly, a lever 11b rotates in a horizontal plane as the spherical member 83 rotates. The diameter of the shaft 11a is sufficiently less than the width of the openings defined between the adjacent projecting parts 82, permitting movement of the shafts 11a in each opening.

A mechanism (not shown) disposed in the housing 11c closes and opens the pawls 10 to grip and release an article 9.

The operation of the above-mentioned arrangement will not be explained.

Figure 9:
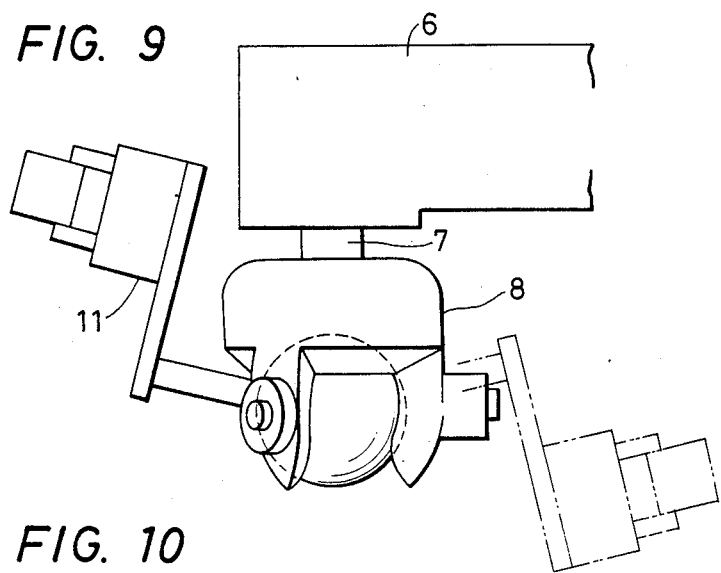
FIG. 9 is a front view illustrating the evading motion in a vertical plane performed by the evading mechanism.
Figure 10:
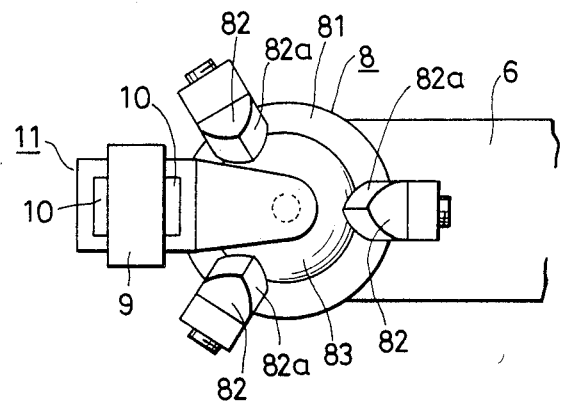
FIG. 10 is a bottom view in which the evading mechanism and the operating mechanism at the front end of the arm device are observed upwardly.
Figure 11:
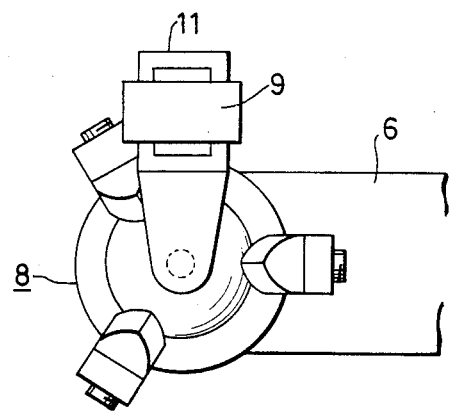
FIG. 11 is a bottom view illustrating a condition in which the operating mechanism performs its evading motion in a horizontal plane.

If the operating mechanism 11 strikes an object in the way of its horizontal movement effected by rotation of the drive shaft 7 and/or rotaton of the second arm 6, the operating mechanism 11 is stopped at that position. However, since the drive shaft 7 and/or the second arm 6 continue their movements, the balls 84d in the coupling mechanisms 84 come out of the recesses 85 in the spherical member 83, overcoming the force of the coil springs 84b, so that the operating mechanism 11 can move with respect to the housing 81. As a result, the operating mechanism 11 can evade the obstacle by movement in the vertical direction, as shown in FIG. 9, or by movement in the horizontal direction from the position shown in FIG. 10 to the position shown in FIG. 6. Therefore, damage to the operating mechanism 11 due to the impact force is prevented.

The evading motion can be made not only in the horizontal and vertical directions, but also in an oblique direction.

In this embodiment, since the holding members for the spherical member 84 are composed of the projecting parts 82, the openings defined between the projecting parts 82 can be utilized for the evading motion, and therefore the range of the evading motion of the operating mechanism 11 can be increased as shown in FIG. 9, that is, the range of the evading motion can extend over an angle of 90 degrees from the normal position of the operating mechanism 11.

Further, since the lower edge surface of the housing 81 (the outer surfaces of the projecting parts 82) are formed of inclined surfaces which form openings gradually widening outwardly, the rotational range of the operating mechanism 11 (or the operating shaft 11a) is increased.

Moreover, with the evading mechanism 8 composed of the housing 81 provided with the projecting parts 82 and the spherical member 83 housed in the housing 81, it is possible to carry out evading motion in all directions with an evading mechanism of simple and miniaturized construction, which can be manufactured at a low cost.

In the above-mentioned embodiment, it has been explained that the robot arm rotates in a horizontal plane. However, the present invention can also applied in an arrangement wherein the arm moves primarily in the vertical direction.

Still further, the number of the projecting parts 82 need not be three, and, for example, two or four projecting parts can be employed.

The coupling members 84 explained above apply pressing forces acting horizontally on the spherical member 83. However, these forces can be applied not only in the horizontal direction, but also applied in an obliquely downward direction as well.

In the above described two embodiments, it has been explained that the conical recesses 85 are formed in the outer peripheral surface of the spherical member 83 and that the balls 84d are disposed in the housing 81. However, the same technical effect can be also be obtained in an arrangement where the conical recesses 95 are formed in the inner wall of the spherical socket or space in the housing 81 and the balls 84d are incorporated in the spherical member 83. Furthermore, it is possible to provide an arrangement in which the displacements of the balls 84d when the operating mechanism strikes a obstacle are detected and the operation of the robot and/or the operating mechanism 11 accordingly interrupted.

I claim:

1. An arm device for an industrial robot, comprising: an arm; means for moving said arm in an instructed direction; an operating mechanism coupled to a part of said arm for carrying out an instructed operation; and an evading mechanism disposed between said arm and said operating mechanism for allowing said operating mechanism to perform relative movement with respect to said arm when an extraordinary external force is exerted on said operating mechanism so as to permit said operating mechanism to perform an evading motion; the improvement wherein said evading mechanism comprises:

(a) a housing coupled to and fixed to said arm;
   (b) a movable member rotatably mounted in said housing so as to be rotatable in horizontal and vertical directions; and
   (c) at least one coupling mechanism for applying a coupling force between said housing and said movable member so as to inhibit relative movement between said housing and said movable member during normal operation but to allow said relative movement between said housing and said movable member upon occurrence of said extraordinary external force, wherein said housing comprises a plurality of circumferentially spaced projecting parts extending away from said arm, said projecting parts defining therebetween circumferentially spaced openings, said movable member being mounted in said housing so as to be rotatable in horizontal and vertical directions, said arm device further comprising a coupling shaft joining said evading mechanism and said operating mechanism, said coupling shaft having a diameter less than a width of one of said openings between said projecting parts, and wherein said at least one coupling mechanism comprises a plurality of coupling members, each coupling member being disposed in a respective one of said projecting parts, and said projecting parts being located laterally of said movable member, whereby said coupling members apply coupling forces laterally of said movable member in plural directions.

2. The arm device for an industrial robot as set forth in claim 1, wherein said movable member comprises a spherical member.

3. The arm device for an industrial robot as set forth in claim 2, wherein said movable member has a spherical outer surface and is forced therein with recesses in positions corresponding to said coupling members, and wherein said coupling members comprise resilient pressing members extendable and retractable in and out of said recess, whereby said pressing members are retracted and forced out of said recess upon occurrence of said extraordinary external force, thereby allowing said movable member to rotate relative to said housing.

4. The arm device for an industrial robot as set forth in claim 3, wherein said recess is generally conically shaped.

5. The arm device for an industrial robot as set forth in claim 3, wherein said pressing member comprises a ball and a resilient member for applying pressure to urge said ball towards said movable member.

6. The arm device for an industrial robot as set forth in claim 5, further comprising an adjusting screw for adjusting the pressure of said resilient member with respect to said ball.

7. The arm device for an industrial robot as set forth in claim 1, wherein said movable member comprises a spherical member, and wherein said housing including said plurality of projecting parts defines therein a spherical space and said movable member is held in said housing spherical space for rotation in horizontal and vertical directions.

8. The arm device for an industrial robot as set forth in claim 1, wherein said openings between said projecting parts terminate within said housing in proximity to said arm at a point which is closer to the arm than the center of rotation of said movable member carried by said projecting parts is to said arm.

9. The arm device for an industrial robot as set forth in claim 1, wherein said openings defined between said projecting parts have edge surfaces all of which are formed by inclined surfaces flaring outwardly of said housing.

* * * * *